March 12, 1963 O. W. MEMELINK 3,081,404

P-I-N SEMI-CONDUCTOR DEVICE HAVING NEGATIVE DIFFERENTIAL RESISTANCE PROPERTIES

Filed Feb. 12, 1959 3 Sheets-Sheet 1

INVENTOR

OSCAR WILLEM MEMELINK

BY

AGENT

INVENTOR
OSCAR WILLEM MEMELINK
BY
[signature]
AGENT

INVENTOR
OSCAR WILLEM MEMELINK
BY
Frank R. Jifari
AGENT

United States Patent Office 3,081,404

Patented Mar. 12, 1963

3,081,404

P-I-N SEMI-CONDUCTOR DEVICE HAVING NEGATIVE DIFFERENTIAL RESISTANCE PROPERTIES

Oscar Willem Memelink, Eindhoven, Netherlands, assignor to North American Philips Company, Inc., New York, N.Y.

Filed Feb. 12, 1959, Ser. No. 792,902
Claims priority, application Netherlands Feb. 15, 1958
16 Claims. (Cl. 307—88.5)

This invention relates to semi-conductor devices comprising a semi-conductive electrode system, which may be used inter alia as an electronic switch, a diode having a variable threshold voltage, and a negative alternating-current resistor. The invention also relates to the semi-conductive electrode systems themselves and to their use in circuit arrangements.

Various semi-conductor devices have previously been suggested which may be used for obtaining a negative differential resistance. The value of the negative differential resistance and its location in the current-voltage curve is then often determined substantially by the internal properties and structure of the semi-conductive electrode system. In practice this is sometimes felt as a drawback, since the possibilities of varying and matching the negative differential resistance are thus limited in such semi-conductor devices, once the semi-conductive electrode system is built up. Besides, the requirements to be imposed upon semi-conductor devices with regard to their negative differential resistance, value and location affects the reproducibility of the techniques used in the manufacture of the semi-conductive electrode system which techniques are already difficult enough per se on account of their considerable refinement.

An object of the invention is inter alia to provide a very simple semi-conductor device which may be used with great advantage inter alia for obtaining a negative differential resistance, but in which the value and the location of the negative differential resistance are determined by steps taken externally in the circuit arrangement and in simple connection therewith rather than by the internal structure of the semi-conductive electrode system itself. The semi-conductor device according to the invention permits of obtaining not only a negative differential resistance, but also other very useful switching possibilities.

A semi-conductor device according to the invention comprises a semi-conductive electrode system, the semi-conductive body of which has the structure of a diode comprising two electrodes of different types separated by a high-ohmic or resistive part and on this high-ohmic part a further rectifying electrode hereinafter referred to as the control electrode, the depletion layer of which can interrupt the current path in the diode structure from the electrode different in type from the control electrode, hereinafter referred to as the surge electrode, to the electrode corresponding in type to the control electrode, hereinafter referred to as the base electrode, without bringing about punch-through to the base electrode. The semi-conductor device according to the invention also comprises means of applying a cut-off voltage to the control electrode with respect to the base electrode, which is equal to, or higher than the pinch-off voltage, and means of applying such potential to the surge electrode with respect to the underlying high-ohmic part as can polarise the surge electrode in the forward direction.

The diode structure referred to above is usually to be understood to mean the structure which is sometimes indicated by p-s-n (n-s-p) or by p-i-n (n-i-p), wherein "s" and "i" indicate the high-ohmic or intrinsic semi-conductive layer of the diode. The two low-ohmic zones of opposite conductivity types located on each side of the high-ohmic or intrinsic layer constitute, together with the contacts provided thereon, the two electrodes of different type of the diode structure, viz. the surge electrode and the base electrode. The term "electrode" is therefore to be understood in this case to mean the contact with the associated low-ohmic zone which determines the type of the electrode. Two such electrodes are thus imagined to be of the same type if the low-ohmic zones associated with their contacts are of the same conductivity type. As will be explained more fully hereinafter, it has been found possible in certain cases to form the surge electrode or the base electrode as a point contact, provided such a point contact in electrical respect, particularly as regards the injection of charge carriers into the high-ohmic part, has the same behaviour as the doped zone or electrode which is replaced by the point contact. The expressions "electrode," "corresponding in type," and "differing in type" must therefore be understood in a wide sense such as to include also the point contact and to permit in this sense also comparison of the types of the point contact and the doped electrode.

Punch-through from a depletion layer to an electrode is to be understood to mean the extension of the depletion layer to this electrode. The term "pinch-off voltage" is to be understood to mean the minimum potential difference in the blocking direction between the control electrode and the base electrode, at which the current path from the surge electrode to the base electrode is still interrupted by the depletion layer of the control electrode. By providing that the distance through which the depletion layer must penetrate the high-ohmic part to bring about interruption of the current path is small and the specific resistance of the high-ohmic layer is high, the pinch-off voltage may be extremely low, for example less than 1 volt. Thus, the choice of the specific resistance of the high-ohmic layer depends upon the pinch-off voltage which is permissible in connection with the particular use. In order to bring about penetration of the depletion layer of the control electrode into the high-ohmic part, it is necessary with a doped electrode, as is well-known that this part is more high-ohmic than the semi-conductive zone associated with the control electrode. The expressions "high-ohmic" and "low-ohmic" are therefore to be understood in a relative sense rather than in the absolute sense. It will be evident, that it is also possible for the semi-conductor device according to the invention to comprise not only the afore-mentioned means of applying the said potential distribution, but also means of applying a different potential distribution, for example means by which the semi-conductor device can be changed from the said condition of potential distribution to another condition of potential distribution temporarily or intermittently. The present invention utilises inter alia the recognition that, in the semi-conductor device according to the invention, for differences in blocking voltage between the control electrode and the base electrode which are equal to, or greater than the pinch-off voltage, the potential of the surge electrode, if it is in the floating condition, follows the potential of the control electrode substantially with the exception of the pinch-off voltage, which latter voltage may be made low by suitable proportioning as mentioned above. In the semi-conductor device according to the invention, the threshold voltage of the rectification curve of the diode structure in a large range of voltages, viz. that above the pinch-off voltage, is thus determined by the potential of the control electrode, since the surge electrode in this voltage range follows the potential of the control electrode and thus, if it is of the p-type, is first brought in the direction of passage by a potential higher than that of the surge electrode and, if it is of the n-type, is first brought in the direction of passage by a potential lower than that of the surge electrode, whereas the reverse is true of the blocking direction of the diode.

A further recognition which gives an explanation of the occurrence of a negative differential resistance and the suitability as an electronic switch may be found in the following consideration.

When the surge electrode is polarised in the forward direction, charge carriers are injected into the high-ohmic part by the surge electrode of a type which does not flow to the control electrode due to the opposite field in the depletion layer of the control electrode, since the control electrode and the surge electrode are of opposite types. However, the charge carriers injected by the surge electrode laterally find their way towards the base electrode, whereas the base electrode injects charge carriers of the opposite type for neutralisation. A proportion of the charge carriers supplied by the base electrode recombines with those injected by the surge electrode and the remaining portion in the depletion layer of the control electrode encounters a field directed towards this electrode, thus providing a control-electrode current. As a rule, there is a substantially linear relationship between the current of the control electrode and the current of the surge electrode through a large range of currents, an increase or decrease of the one resulting in an increase or decrease of the other. If the circuit of the control electrode-base electrode includes an ohmic load, this load becomes active as a positive feedback and thus brings about a negative differential resistance in the circuit of the base electrode-surge electrode, the value of which is in a substantially constant and substantially temperature-independent relationship to the value of the ohmic load.

General requirements to be imposed in connection with the invention upon the semi-conductive electrode system itself have briefly been mentioned hereinbefore in the description of the semi-conductor device according to the invention. A particularly suitable embodiment of a semi-conductive electrode system for use in the device according to the invention is that in which the semi-conductive body comprises a thin disc of high-ohmic semi-conductive material on which the rectifying control electrode and the electrode of opposite type of the diode structure, the said surge electrode, are located in opposition, while laterally of said electrodes there is provided the electrode of the diode structure corresponding in type to the control electrode, the said base electrode. The distance between the electrodes and the specific resistance of the semi-conductive material are so chosen that with a suitable pinch-off voltage as is desirable in connection with the particular use, the depletion layer of the control electrode can interrupt the current path from the base electrode to the surge electrode without causing punch-through to the base electrode. The assembly is preferably symmetric of design having as its axis of symmetry the connecting line between the centres of the surge electrode and the control electrode, the base electrode being arranged at a small distance from the other electrodes in the form of a ring. In order to ensure satisfactory interruption of the current path by the depletion layer of the control electrode in this particular embodiment, also the diameter of the control electrode is chosen to be larger than that of the surge electrode and preferably at least 1½ times larger.

In order that the invention may be readily carried into effect, its various aspects will now be explained in detail, by way of example, with reference to several diagrams and embodiments shown in the accompanying drawings.

Figure 7:
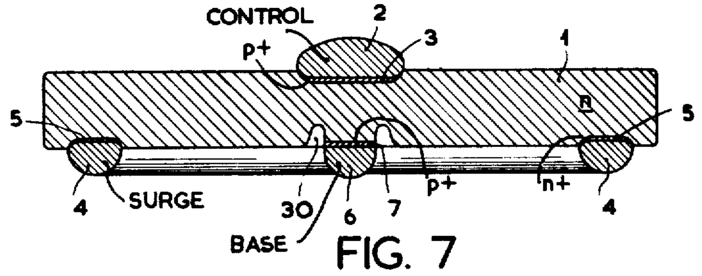
Figure 8:
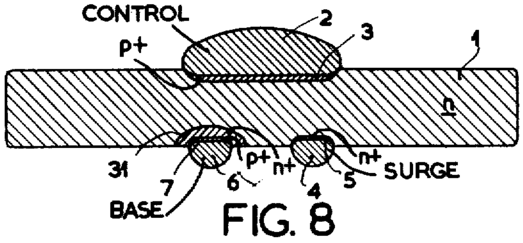
Figure 9:
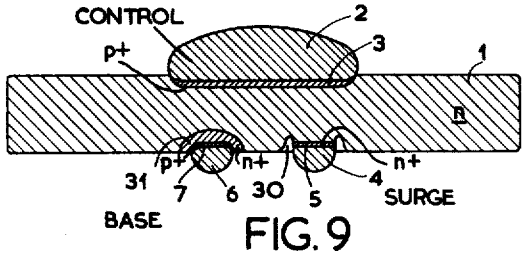

FIGS. 7 to 9 diagrammatically show cross-sections of several other embodiments of an electrode system for use in the device according to the invention.

Figure 10A:
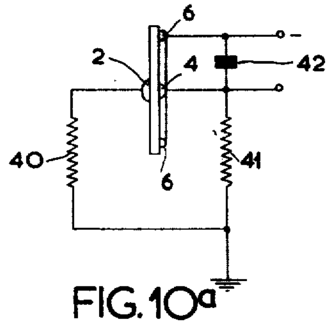

FIG. 10*a* shows an example of a circuit diagram of a device according to the invention for producing a saw-tooth oscillation.

Figures 10B, 10C:
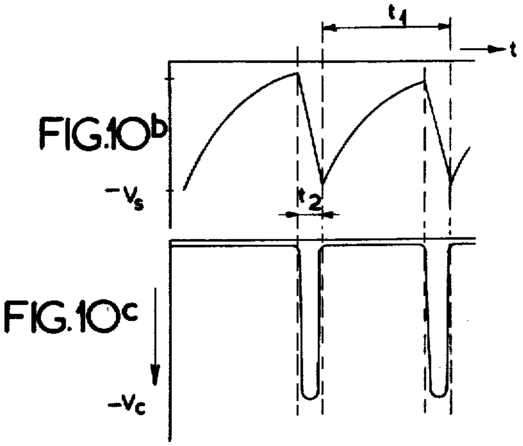

FIGS. 10*b* and 10*c* show the course of the potentials of the surge electrode and of the control electrode relating to the device of FIG. 10*a*.

Figure 1:
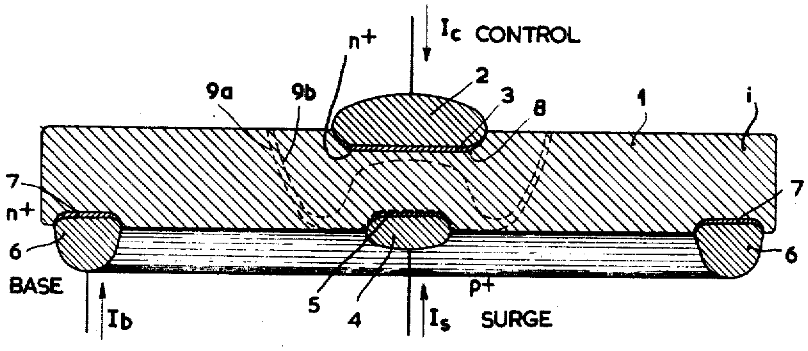
FIG. 1 shows diagrammatically a cross-section of a very suitable semi-conductive electrode system according to the invention.

In the very advantageous embodiment shown in FIG. 1, two electrodes of opposite type, that is to say the control electrode comprising a contact 2 and the associated low-ohmic n-type zone 3, and the surge electrode comprising a metal contact 4 and the associated low-ohmic p-type zone 5, are alloyed in opposition on a disc-like semi-conductive body 1 of intrinsic germanium. Along the periphery of circular-symmetric semi-conductive body 1 there is provided the base electrode comprising an annular metal contact 6 and the associated annular low-ohmic n-type zone 7. The base electrode (6, 7) constitutes together with the surge electrode (4, 5) the p-i-n diode structure of said semi-conductive electrode system. The annular shape of the base electrode is not essential to the performance, but is preferably used in connection with the further improvement in the diode characteristic which may thus be obtained. By the use of intrinsic semi-conductive germanium in the body 1, all three dotated electrodes constitute a rectifying junction with the body. For the performance according to the invention, however, there is only the primary condition that the control electrode constitutes a rectifying junction. Since the base electrode and the control electrode correspond in type, the base electrode also is always a more or less rectifying junction. However, this requirement does not exist at all for the surge electrode.

If earth potential is applied to the base contact 6 and a positive blocking voltage applied to the control contact 2 is higher than the pinch-off voltage, a depletion layer penetrating the body from the blocking layer 8 of the control electrode envelopes the smaller surge electrode and thus fully interrupts the current path through the diode structure (4—5—1—7—6) in the high-ohmic intrinsic zone 1. This is indicated in FIG. 1 by dotted line $\mathbf{9}_a$, which represents the border line of the extension of the depletion layer associated with a given potential of the control electrode. The depletion layer—as is well-known, this is a layer which does not substantially contain mobile charge carriers—occurs due to the electrons being drawn to the positive control electrode and the holes being drawn to the base electrode. The holes recombine near the base electrode with the electrons supplied by the base electrode. The blocking current of control contact 2, indicated in FIG. 1 by $I_c$, in the direction of the arrow may be kept small and show saturation by suitable proportioning. Due to the use of intrinsic material, the current path between the surge electrode and the base electrode is interrupted already at a low potential of the control electrode, while by suitable choice of the distance between the base electrode and the control electrode i.e. a larger spacing than that between the control and surge electrodes, punch-through to the base electrode is avoided. Punch-through of the depletion layer from the control electrode to the base elecrode (6, 7) would have the undesirable consequence that the blocking action between the base electrode (6, 7) and the control electrode (2, 3), which electrodes are of the same type, would be neutralized by the short-circuiting action of the punch-through. As may be also seen from the figure, the control electrode is considerably larger than the surge electrode, which is very favourable to ensure satisfactory closure of the current path by the depletion layer in this embodiment of the semi-conductive electrode system according to the invention. It also follows from FIGURE 1 that interruption of the current path by the depletion layer of the control electrode (2, 3) involves punch-through to the surge electrode (4, 5). However, since these electrodes are of opposite types, punch-through is not harmful. The surge electrode injects directly into the depletion layer of the control electrode.

For potentials $V_c$ of the control electrode higher than the pinch-off voltage $V_k$, there now applies with good approximation for the potential of the surge electrode $V_s$, if the surge electrode is in the floating condition or biased in the forward direction: $V_s=V_c-V_k$. On intrinsic germanium and with a distance of from 20 to 30 microns between the surge electrode and the control electrode, pinch-off voltages of 1 volt and lower may be well realised in practice. The property that the potential of the surge electrode under the said conditions follows in a comparatively large range of potentials the potential of the control electrode except for the potential difference $V_k$, which is substantially constant, is a particular feature of a semi-conductive electrode system according to the invention. By varying the potential of the control electrode, for example from 2 to 50 volts, the potential of the surge electrode at a pinch-off voltage of 1 volt is varied under a corresponding range, that is to say, from 1 to 49 volts.

If, in the embodiment shown in FIG. 1, a potential is applied to the surge electrode lower than the potential $V_c-V_k$, impressed by the control electrode, only a blocking current flows through the surge electrode. However, as soon as the potential externally applied to the surge electrode exceeds the impressed potential, the surge electrode is polarised in the forward direction and injects holes into the depletion layer which recombine with the charge carriers of opposite type injected by the base electrode for neutralisation. By increasing the potential of the surge electrode above the impressed potential, the surge electrode is thus brought from the blocked condition into the direction of passage. This behaviour clearly appears from FIG. 2, in which the potential $V_s$ of the surge electrode is plotted horizontally in arbitrary units and the current $I_s$ of the surge electrode is plotted vertically in arbitrary units. Curve 10 represents the known rectification characteristic of the p-i-n diode structure at floating potential $V_c$ of the control electrode. Curves 11 and 12 are each associated with a different constant potential $V_c$ of the control electrode which was higher than the pinch-off voltage $V_k$. If the pinch-off voltage is lower than 1 volt, threshold voltages 11$a$ and 12$a$, associated with the rectifying curves 11 and 12, substantially correspond to the constant potential $V_c$ of the control electrode associated with each curve. When the surge electrode is polarised in the forward direction, the potential of the surge electrode remains substantially constant if $V_c$ is constant, as also appears from the characteristic curves of FIG. 2, whereas in the case of polarisation in the blocking direction a good blocking action may be obtained. In practice, it was found on a semi-conductive electrode system as shown in FIG. 1, that $V_s$ could remain substantially constant, for example up to current densities of about 10 amps per square cm. The semi-conductor device according to the invention is therefore quite serviceable as a diode having a variable threshold voltage.

Figure 3:
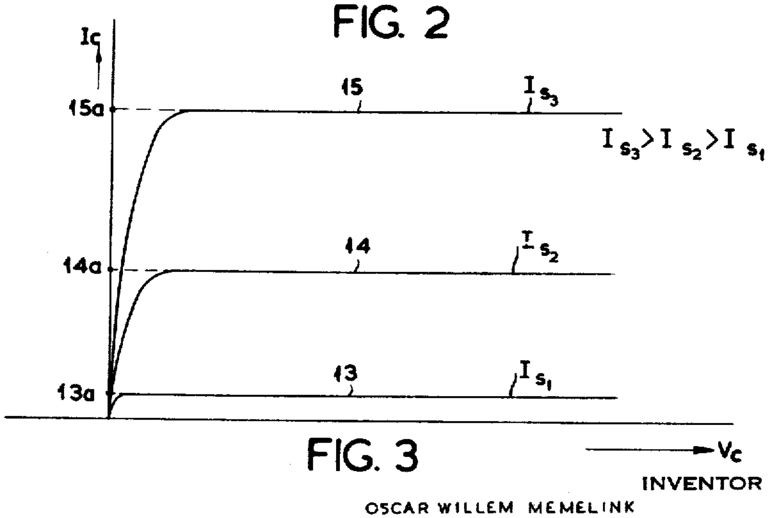
Figure 4:
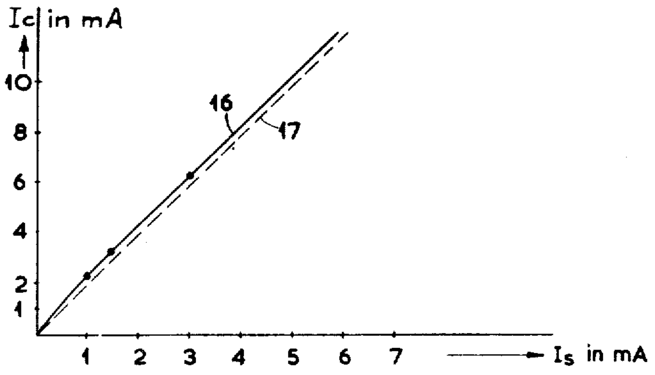

When the surge electrode is polarised in the forward direction, holes are injected into the depletion layer of the control electrode. However, since the control electrode and the surge electrode are of different types, said charge carriers in the depletion layer of the control electrode meet with a field directed from the control electrode and thus laterally deviate to the base electrode. The base electrode, which is also polarised in the forward direction, injects charge carriers of opposite type into the high-ohmic zone for neutralisation. Due to this considerable increase in the number of charge carriers for the surge electrode, an electroneutral zone is formed in front of this electrode and the depletion layer of the control electrode is repelled so far as it is situated in the vicinity of the surge electrode. An example of the extension of such a repelled depletion layer is indicated by the dotted line 9$b$ in FIG. 1. A proportion of the charge carriers injected by the base electrode recombines with the charge carriers injected by the surge electrode. However, another proportion finds its way into the depletion layer of the control electrode, meeting therewith a field directed towards the control electrode and thus bringing about a control-electrode current. As a rule, there applies that a substantially linear relationship exists between the current $I_s$ of the surge electrode and the current $I_c$ of the control electrode in a large range of currents, in other words $I_c=c\times I_s$, wherein $c$ represents a constant. From theoretical considerations it also appears that in a semi-conductive electrode system with the geometry shown in FIG. 1, the ratio between the current $I_c$ of the control electrode and the current $I_s$ of the surge electrode may with good approximation be equal to the ratio between the mobility of the type of charge carriers associated with the control electrode and the mobility of the type of charge carriers associated with the surge electrode. In the embodiment shown in FIG. 1, in which the semi-conductive body consists of germanium, the surge electrode is of the p-type and the control electrode is of the n-type, said ratio would therefore with good approximation be equal to the ratio between the mobility of the electrons and the mobility of the holes in germanium, which ratio, as is well-known, is approximately equal to 2. Consequently, it has repeatedly been found in practice that the current of holes $I_s$ brings about a current of electrons $I_c$ in the control electrode, for which there applies with good approximation $I_c=2I_s$. In FIG. 3, the voltage $V_c$ of the control electrode is plotted horizontally and the current $I_c$ of the control electrode is plotted vertically in arbitrary units. The curves 13, 14 and 15 each have been traced at a given constant value of the surge-electrode current $I_s$, the value of $I_s$ in the same sequence being higher than the rank numbers of the curves. The ordinates 13$a$, 14$a$ and 15$a$ are each equal to approximately twice the associated $I_s$-value. The constant ratio 2 appears even more clearly from the curve shown in FIG. 4, in which the surge-electrode current $I_s$ is plotted horizontally in milliamps and the control-electrode current $I_c$ is plotted vertically in milliamps for a constant value of the potential of the control electrode. The size of scale of $I_s$ is chosen twice that of $I_c$. The curve 16 was measured on a semi-conductive electrode system as described with reference to FIG. 1 and the manufacture of which will be explained in detail hereinafter. Curve 17 shows the ideal case in which $I_c$ would be exactly equal to twice $I_s$. True the measured curve 16 is not completely coincident with curve 17, but deviates therefrom only slightly. It has been found that the course of the curve 16 was hardly influenced by variations in the potential of the control electrode. On the ground of the same theoretical considerations, it may be expected that in a semi-conductive electrode system, the semi-conductive body of which consists of germanium and in which the surge electrode of the n-type and the control electrode of the p-type there applies with good approximation: $I_c=\frac{1}{2}I_s$, since the ratio between the mobility of the holes and the mobility of the electrons in germanium is approximately ½. When using a semi-conductor other than germanium having another mobility ratio, another value connected therewith may be expected for the proportionality constant. However, it is to be noted that, in the case of deviation from the geometry shown in FIG. 1, considerable differences may also occur in the value of the proportionality constant. Although the theory concerning the value of the proportionality constant constitutes a particular refinement facet within the scope of the invention, the invention is, of course, not limited thereto, since for obtaining the effects of the invention it is in general necessary only that an increase in the current of the surge electrode results in an increase in the current of the control electrode in a comparatively large range of currents. It frequently appears that a substantially linear relationship then exists between the current of the surge electrode and that of the control electrode.

Figures 5, 6:
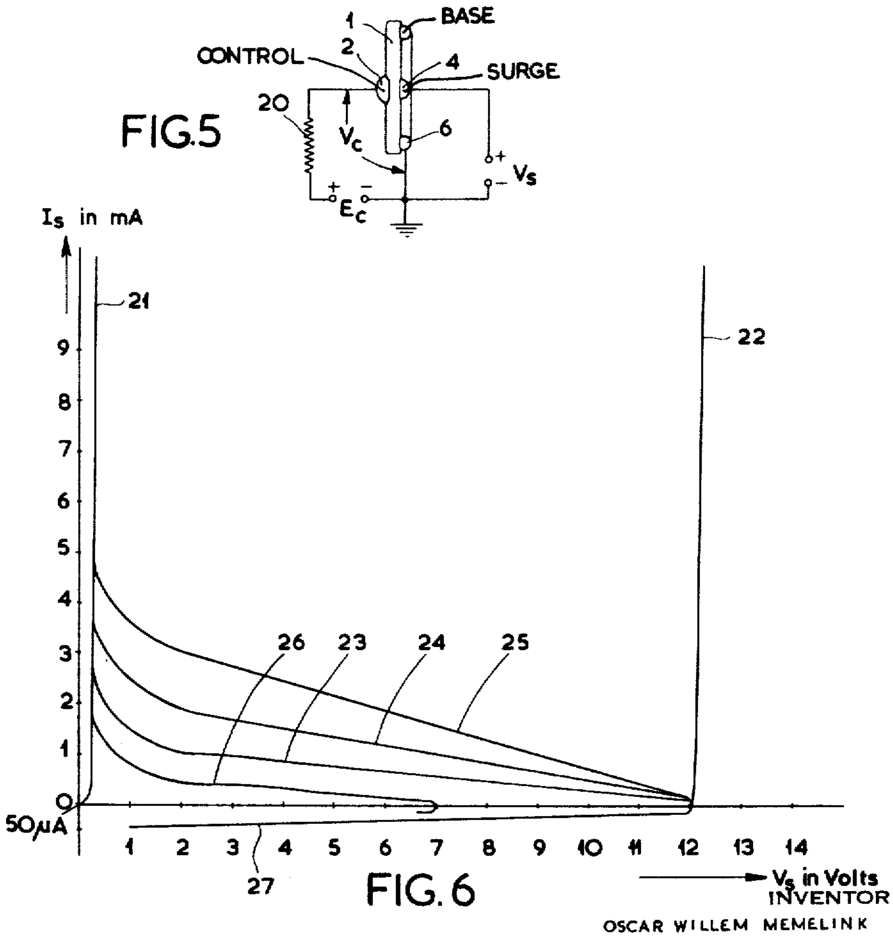
FIG. 5 shows a circuit diagram of a semi-conductor device according to the invention for producing a negative differential resistance.
FIG. 6 shows several characteristic curves of the device of FIG. 5.

A further aspect of the invention will now be explained with reference to FIGS. 5 and 6, that is to say the obtainment of a negative differential resistance. FIG. 5 shows a circuit diagram of such a semi-conductor device. Between the control contact 2 and the base contact 6 there is connected a voltage source $E_c$ in series with an ohmic load 20. The base contact 6 is connected to earth. The potential difference $V_c$ is chosen higher than the pinch-off voltage $V_k$. The surge electrode 4 thus assumes a potential substantially equal to the potential of the control electrode less the pinch-off voltage $V_k$. The circuit of the base electrode-surge electrode includes a source $V_s$ which polarises the surge electrode in the forward direction, thus injecting a current of holes $I_s$ into the semi-conductive body. In the semi-conductive electrode system shown in FIG. 1, having the characteristic curves shown in FIG. 2 to 4, said current of holes $I_s$ results in a control-electrode current $I_c$, for which there applies with good approximation: $I_c=2I_s$. Assuming that the current of the surge electrode increases with $\Delta I_s$, this increase of $I_s$, since $I_c=2I_s$, involves an increase in the control electrode current $\Delta I_c=2\Delta I_s$. However the increase $\Delta I_c$ is attended with a decrease in the potential $\Delta V_c$ of the control electrode which is approximately equal to $-2\Delta I_s R$, if R represents the value in ohms of the load 20. However, since there applies with good approximation that $V_s=V_c-V_k$, wherein $V_k$ is a constant, the decrease in the potential of the control electrode brings about a decrease in the potential of the surge electrode, which is substantially equal to the decrease in the potential of the control electrode, in other words with good approximation there applies $\Delta V_s=\Delta V_c$. From this it follows that with good approximation there also applies: $\Delta V_s=-2\Delta I_s R$ or $$\frac{\Delta V_S}{\Delta I_S}=-2R$$

The characteristic curve $I_s-V_s$ thus shows a negative differential resistance which, for this geometry and for the case under consideration, is equal to the ratio between the mobility of the electrons and the mobility of the holes in germanium, multiplied by the resistor R included in the external circuit. In the general case in which there applies $I_c=cI_s$, the value of the negative differential resistance is approximately $-cR$. The potential on the surge electrode decreases on account of the increasing potential drop across resistor 20, until the potential difference across the depletion layer on the control electrode has become substantially zero. In this condition the depletion layer has shriveled to a small zone on the control electrode. Substantially the whole intrinsic material is flooded with holes and electrons. Further increase in the surge-electrode current $I_s$ results in an increased potential of the surge electrode, the branch of the characteristic curve associated with this zone then following the known characteristic curve of the p-i-n diode structure. This aspect will now be explained with reference to the graph of FIG. 6, in which the surge-electrode potential $V_s$ is plotted horizontally in volts and the surge-electrode current $I_s$ is plotted horizontally in milliamps. The curves shown in FIG. 6 relate to a semi-conductor device as shown in FIG. 1, the manufacture of which will be explained more fully hereinafter. Curve 21 shows the forward branch of the rectification curve $I_s-V_s$, measured at floating potential of the control electrode. Curve 22 represents the rectification curve of the p-i-n diode structure, measured at a constant $E_c$ of +12.3 volts. As may be seen from the figure, the threshold voltage of the diode characteristic is substantially equal to the potential of the control elecrode, since the pinch-off voltage for the diode was about 0.3 volt. Curve 23 was measured in a circuit as shown in FIG. 5, in which R was about 4.7K ohms and $E_c$ was about 12.3 volts. When $I_s$ increases, $V_s$ decreases until the curve for a higher $I_s$ falls back on the forward branch of the p-i-n diode curve 21. The slope of the negative resistance branch of 23 and hence the value of the negative differential resistance is about 10K ohms, as may be seen from the figure. The negative differential resistance is thus approximately twice the external load R. The curves 24, 25 and 26 show a similar course. The curves 23, 24 and 25 were traced at the same $E_c$=12.3 volts, the value of the load resistance only being different. This value was for these cases 4.7K ohms, 2.7K ohms and 1.5K ohms, respectively. Said curves thus clearly show the difference in negative differential resistance, the value of which corresponds to twice the value of R. Curve 26 was traced at an $E_c$ of about 7 volts, the external load resistance 20 being 4.7K ohms, as in the case of curve 23. It thus clearly appears from the figure that the negative differential resistance was substantially the same for either case.

With reference to the embodiment of a semi-conductive electrode system according to the invention as shown in FIG. 1, several more general considerations limited not only to this embodiment will now be given as being important for best suitable proportioning. From the curves shown in FIG. 6 it appears that the device according to the invention, if included in a circuit the principle of which is shown in FIG. 5, may have one of two different stable conditions, that is to say a condition of high conductivity on the forward branch 21 of the p-i-n diode and a condition of low conductivity on the blocking branch 27. In the state of high conductivity, a low potential for the surge electrode is usually desirable with a given current of the surge electrode. The distance between the base electrode and the surge electrode—this is the thickness of the high-ohmic or intrinsic part—is preferably chosen less than 5 times the diffusion length of the charge carriers. voltage permissible therefor. In the "off" condition, on the expression: $\sqrt{D\tau}$, wherein D is equal to the ambipolar diffusion constant in cm.²/sec. and $\tau$ is the effective period of life in seconds of holes and electrons in the semi-conductive material. For the ambipolar diffusion constant there applies:

$$D=\frac{2D_nD_p}{D_n+D_p}$$

wherein $D_n$ and $D_p$ represent the diffusion constant of electrons and that of holes in cm.²/sec. Furthermore, the "on" resistance between said electrodes may be decreased by giving the current path between the surge electrode and the base electrode a cross-section as large as is still possible in connection with the obtainable closing effect of the depletion layer and the value of the pin-off voltage permissible therefore. In the "off" condition, on the one hand, the blocking current between the base electrode and the surge electrode and, on the other, the blocking current between the base electrode and the control electrode are preferably as small as possible and saturated for obtaining a high positive differential resistance. In view of the fact that the surge electrode can attract only a small number of charge carriers from the depletion layer located in the vicinity thereof, the blocking current of the surge electrode is usually small. The blocking current in the circuit of the base electrode-control electrode may be reduced by using either a semi-conductor having a comparatively large energy gap between valency and conduction band, for example silicon, which permits of obtaining a low blocking current, and/or by a low gain factor of the transistor structure formed by the base electrode-high-ohmic part-control electrode. The last-mentioned step is preferably applied to a semi-conductor having a comparatively small energy gap such, for example, as germanium, and for this purpose the distance between the base electrode and the control electrode is preferably chosen to be larger than one diffusion length as defined hereinbefore. In practice, it has been found possible without much difficulty of obtain an "on" resistance of 20 to 100 ohms and an "off" resistance of 1 to 10 megohms in an embodiment as shown in FIG. 1. From a viewpoint of switching it is frequently advantageous that in the dynamic condition between the "on" and "off" conditions the surge electrode follows the potential on the control electrode as closely as possible and in a large range. To ensure this, the depletion layer of the control electrode must have an optimum closing action. In the embodiment shown in FIG. 1, the control electrode is thus preferably given a diameter larger than, more particularly a factor 1.5 or more larger than, the diameter of the surge electrode. In order to obtain a low pinch-off voltage $V_k$ and a small difference between the potential of the surge electrode and that of the control electrode, a semi-conductor is used in the high-ohmic part having a low content of active impurities or a small difference content between the two types of active impurities. This means that, in absolute value, $N_d - N_a$, wherein $N_d$ represents the number of active impurities of the donor type per $cm.^3$ and $N_a$ represents the number of active impurities of the acceptor type per $cm.^3$, is chosen low, for example less than $5\times10^{13}/cm.^3$ and preferably less than $10^{13}/cm.^3$. Thus, pinch-off voltages less than 10 volts may be obtained very well, Preferably, pinch-off voltages of even less than 3 volts are used. As a rule, in a semi-conductor device according to the invention, the pinch-off voltage is preferably chosen low with respect to the operating voltage to be applied between the base electrode and the control electrode, that is to say the pinch-off voltage is preferably less than ⅕ times the operating voltage desirable for the particular use. According as a greater switching speed is desired, semi-conductive material having a short lifetime is preferred. Methods of obtaining a short period of life are known per se. For intrinsic germanium, in an embodiment as shown in FIG. 1, a turn-on time and a turn-off time of the electrode system from 10 to 20 microseconds was measured. With the geometry shown in FIG. 1, it is also very important that surface currents and channel formation along the surface are avoided. The presence of adsorbed charges on the surface may result in a short-circuiting action, which not only detrimentally affects the blocking action between the electrodes, but also may result in insufficient extension of the depletion layer towards the surge electrode and hence in insufficient closing action. In view of this effect, a good etching treatment is desirable. Therefore, also with the geometry shown in FIG. 1, the base electrode is preferably arranged on the same side of the semi-conductive body on which the surge electrode is located, in order to make the distance between the base electrode and the control electrode along the surface as large as possible. Since also the channel conductivity on the intrinsic semi-conductive body is proportional to the root of the intrinsic concentration of charge carriers, for avoiding said interfering effects use is preferably made of a semi-conductor having a distance between the conductivity band and the valency band larger than that of germanium, for example silicon. Furthermore, such a semiconductive material having a large distance between the bands permits of obtaining a lower blocking current than is possible with germanium and the influence of temperature upon the blocking current is less.

Although the invention has been explained more particularly with reference to the particularly suitable embodiment of FIG. 1, it is to be noted that numerous further variations are possible within the scope of the invention in regard to the dotation of the semi-conductive electrode system and also the relative positioning of the electrodes. However, according as there is deviated more from the fundamental structure described hereinbefore, certain deviations from the ideal conditions may occur, for example as regards the value of the proportionality constant between the control-electrode current and the surge-electrode current. It appears that it is generally possible to satisfy the general requirement which must be imposed at least for obtaining the negative differential resistance, that is to say that an increase in the current of the surge electrode results in an increased current of the control electrode in a large range of currents. Taking into account the requirement that the control electrode must always constitute a rectifying connection with the semi-conductive body, there are as regards dotation the following possibilities:

| Conductivity of material | type of surge electrode | type of control electrode | type of base electrode |
|---|---|---|---|
| intrinsic | n | p | p |
| intrinsic | p | n | n |
| high-ohmic p | p | n | n |
| high-ohmic n | n | p | p |

In the first column four possibilities are specified for the conductivity of material of the high-ohmic part in the diode, within the horizontal row associated with each possibility there is specified the associated type of electrode. As regards the specific resistances of the semi-conductive zones associated with these electrodes, it is to be noted for completeness sake that the specific resistance of the semi-conductive zone associated with the control electrode is always chosen lower than the specific resistance of the high-ohmic part, in order to permit a good depth of penetration of the depletion layer into the high-ohmic part, while also the specific resistance of the zones associated with the surge electrode and the base electrode is preferably less than the specific resistance of the high-ohmic part, in order to permit a satisfactory injection by said electrodes.

Thus for example the concentration of the active impurities in the high ohmic or high resistance part may be $10^{12}/cm.^3$, whereas the concentration of active impurities of the control electrode semiconductive zone may be about $10^{17}$–$10^{18}/cm.^3$, and the same concentration may apply to the semiconductive zones of the surge and base electrodes thus providing a large difference in conductivity for the regions concerned. The semi-conductors used may be not only the known semi-conductors germanium and silicon, but also other semi-conductors such, for example, as the III–V compounds, for example, GaAs, InP, etc. It is also possible to replace the base electrode or the surge electrode by a point contact, providing requirements are imposed upon the point contact similar to those which the dotated electrode in the p-s-n- or p-i-n-structure has to satisfy. When polarised in one direction, the point contact therefore must constitute a sufficient injection source for the type of charge carriers desirable in connection with its function, whereas when polarised in the other direction, it must substantially not inject any charge carriers of the opposite type. It has been found that on intrinsic semi-conductive germanium a tungsten point could replace a p-type dotated electrode, for example the surge electrode (4, 5) in the embodiment of FIG. 1. Several other semi-conductor devices which differ from the fundamental structure of FIG. 1 will now be explained with reference to FIGS. 7, 8 and 9.

In the embodiment shown in FIG. 7, the semiconductive body consists, for example, of high-ohmic n-type silicon. Identical electrodes of FIGS. 7 and 1 are indicated by the same reference numerals. In contradistinction to the embodiment shown in FIG. 1, in which the surge electrode (4, 5) is opposite the control electrode (2, 3), in the embodiment of FIG. 7 the p-type base electrode (6, 7) opposes the p-type control electrode (2, 3). The base electrode is located within the reach of the maximum extension distance of the depletion layer of the control electrode. However, due to the presence of a groove 30 around the base electrode, it is ensured that the current path from the base electrode to the surge electrode is interrupted in a comparatively large range of voltages (above the pinch-off voltage) without punch-through occurring to the base electrode (6, 7) which is located more remote. The groove 30 penetrates towards the control electrode more deeply than does the base electrode (6, 7)

and contributes to the closure of the current path. The embodiment shown in FIG. 7 may be manufactured in a simple manner, for example, by the use of the known alloying technique, while the groove round the base electrode may be provided in a simple manner by etching, preferably by electrolytic etching.

FIG. 8 shows another embodiment of device according to the invention. Both the surge electrode (4, 5) and the base electrode (6, 7) are provided in opposition to the control electrode (2, 3) on the semi-conductive body 1, which consists for example, of a high-ohmic n-type silicon. The difference with respect to the embodiment shown in FIG. 1 consists especially in the base electrode being provided comparatively closely to the control electrode, that is to say within the maximum extension of the depletion layer which occurs when the current path is interrupted. However, in this embodiment, punch-through from the depletion layer of the control electrode to the base electrode is avoided due to the presence of the low-ohmic n-type zone 31 in front of the base electrode. The depletion layer cannot deeply penertate such a low-ohmic zone on account of the larger number of active impurities present therein, so that punch-through is avoided. If the distance between the surge electrode and the base electrode is small, it is possible to obtain a favourable forward characteristic curve of the diode structure, which affords the possibility for semi-conductors having a comparatively short diffusion length such, for example, as silicon, to provide the base electrode nevertheless within the preferred distance of 5 diffusion lengths of the surge electrode. A comparatively high blocking current might occur between the base electrode and the control electrode (2, 3) between them due to the comparatively short distance. However, this effect of increasing the blocking current may be neutralised, if desired, by the use of silicon as a semi-conductor, which, as is well-known, permits of obtaining much lower blocking currents.

The embodiment shown in FIG. 9 differs from that of FIG. 8 only in that a groove 30 provided round the surge electrode (4, 5) penetrates more deeply towards the control electrode than does the surge electrode. This ensures a better action of closing the current path between the base electrode (6, 7) and the surge electrode (4, 5). In this connection it is observed that the groove 30 need not necessarily surround the surge electrode, but may be provided, for example, around the base electrode. In general, for obtaining a proper closing action by the depletion layer it is already sufficient that the current path above the control electrode is narrowed somewhere between the base electrode and the surge electrode.

The semi-conductive electrode systems shown in FIGS. 8 and 9 may be manufactured, for example, by the use of the known alloying technique. The low-ohmic n-type zone 31 in front of the base electrode (6, 7) may be provided, in a simple manner, for example by adding a rapidly diffusing donor to the alloy 7 to be provided by fusion, which donor at a sufficiently high temperature diffuses from the melt produced during alloying into the body.

The manufacture of a semi-conductive electrode system as shown in FIG. 1 will now be described in greater detail.

There was provided a thin circular germanium plate 1 having a difference content of active impurities less than $10^{12}$ per $cm.^3$, a diameter of 2.5 mms. and a thickness of about 100 microns. A pellet having a diameter of about 500 microns and consisting of 98% by weight of bismuth and 2% by weight of arsenic was alloyed on its upper side at a temperature of about 650° C. An n-type control electrode was thus obtained having a diameter of about 500 microns. Subsequently, a pellet having a diameter of 200 microns and consisting of 99½% by weight of indium and 0.5% by weight of gallium was provided by melting on the opposite side at a temperature of 600° C. A p-type surge electrode was thus obtained having a diameter of about 200 microns. The annular n-type base electrode was provided by alloying a ring consisting of 95% by weight of indium and 5% by weight of arsenic at 550° C. Subsequently, the semi-conductive electrode system was etched electrolytically in an aqueous solution of potassium hydroxide (40%) for 15 seconds at a current of 20 milliamps, the current being supplied to the surge electrode and the germanium body being used as the anode. The electrode system was then rinsed in hot de-ionised distilled water and after-etched in peroxide of hydrogen (30%) for 10 to 15 minutes. Next, the system was again rinsed and the assembly finished in known manner. The distance between the control electrode and the surge electrode was about 30 microns, a pinch-off voltage of about 0.3 volt thus being obtained. The spacing between the base electrode and the surge electrode was about 1.5 mm. Several characteristic curves of this semi-conductive electrode system are shown in FIGS. 2, 3, 4 and 6 have previously been described.

The semi-conductor device according to the invention is suitable for many uses. Its negative differential resistance may be used for all kinds of purposes, such as for reducing the damping of an electric circuit, for producing oscillations, for example, of a sawtooth or pulsatory shape, for obtaining trigger circuits, etc.

Figure 2:
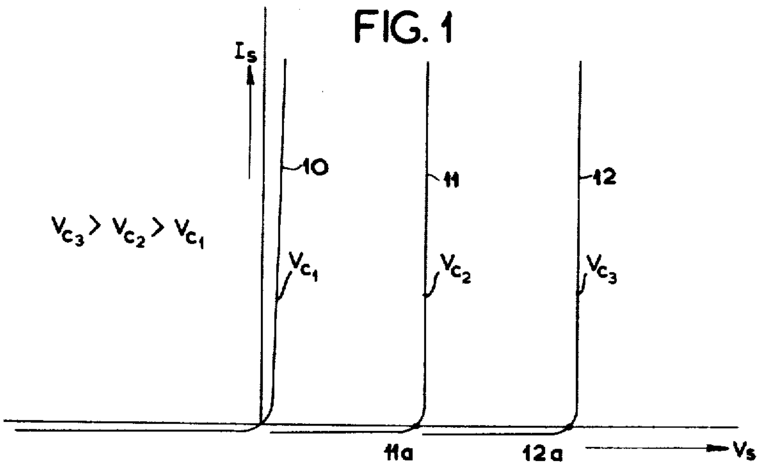
FIGS. 2 to 4 show several characteristic curves of the semi-conductive electrode system of FIG. 1.

As previously mentioned in the description of FIG. 2, the semi-conductor device according to the invention may be used with great advantage as a rectifier having an adjustable threshold voltage. The signal to be rectified is then supplied between the base electrode and the surge electrode, the threshold voltage being applied between the base electrode and the control electrode. Such a rectifier may serve, for example, in control circuits with delayed action, for example a delayed automatic control of amplification, if desired in combination with silent tuning.

The semi-conductor device according to the invention may also be used as a dipole having a negative differential resistance, for example for reducing the damping of an electric lead. A resistor is then included between the base electrode and the control electrode, so that a given negative differential resistance occurs in the circuit of the surge electrode, the value of which is determined substantially by the value of said resistor. The semi-conductor device according to the invention may thus also be used as an electronic switch. In this connection reference is made to FIG. 6 and the corresponding part of the description wherein the condition of low conductivity, the condition of high conductivity and the occurrence of the negative differential resistance have been explained in detail. When used as an electronic switch, the potential of the control electrode is varied with respect to that of the surge electrode by means of a switching voltage, so that the semi-conductor device is changed-over between the two conditions of low conductivity and of high conductivity. This may be effected with a p-type surge electrode, for example, by decreasing the potential of the control electrode with respect to that applied to the surge electrode to an extent such that the surge electrode is polarised in the forward direction. It will be evident that this may be also achieved, for example, with a p-type surge electrode by increasing the potential of the surge electrode with respect to that applied to the control electrode. The same effect may be obtained with an n-type surge electrode, but in this case the potential variations must occur in the reverse direction. From the state of high conductivity the system may be restored to the state of low conductivity by potential variations opposite to those which are used for converting the system from the state of low conductivity to the state of high conductivity. For a semi-conductive electrode system manufactured as described above, the turn-on time and turn-off time of the potentials of the surge electrode and the control electrode was about 10 microseconds. The switching time proved to be hardly dependent upon the value of the resistor included in the control circuit and upon the value of the potential applied to the control electrode. The stability of the change-over point appeared to be very satisfactory and was hardly subject to variations in temperature. The negative differential resistance may also be used for producing sawtooth oscillations. In this case, the circuit of the surge electrode includes a resistor and a capacitor, which, together with the biasing potential applied to the surge electrode, determine the recurrence frequency of the saw-tooth oscillation. An example of such an application will now be explained with reference to FIGS. 10*a*, 10*b* and 10*c*. The elements of FIG. 10 which are identical with those of FIG. 1 are indicated by the same reference numerals. The control electrode 2 is connected to earth via a resistor 40 and the surge electrode 4 is connected to earth via a resistor 41. A capacitor 42 is included between surge electrode 4 and base electrode 6. The base electrode 6 has applied to it a constant negative potential. In a given case, the resistor 40 may be, for example, 3.3K ohms, the resistor 41, 18K ohms, the capacitor 42, 0.1 microfarad and the negative potential −14 volts. The control electrode 2 then is substantially at earth potential and the semi-conductor device is in the "off" condition. The pinch-off voltage is about 1 volt so that the system can be converted into the conductive state only at a potential of about −1 volt at the surge electrode. The capacitor 42 is charged via resistor 41 until the potential of the surge electrode has increased to about −1 volt. The system then assumes the state of conductivity and rapidly discharges capacitor 42. During the discharge time $t_2$, the potential of the control electrode increases to substantially the potential of the source of supply (−14 volts). When capacitor 42 has been discharged, no current occurs between the base electrode and the surge electrode and hence neither between the control electrode and the base electrode, so that the potential of the control electrode has returned to its initial earth potential. The system then again starts with the same cycle. The variations in potential at the surge electrode and the control electrode are shown graphically as a function of time in FIGS. 10*b* and 10*c*. $V_s$ and $V_c$ are plotted vertically on a linear scale in arbitrary units, a linear time-scale being plotted horizontally which coincides for both figures. The discharge time $t_2$ and the recurrence time $t_1$ shown in said figures were about 10 microseconds and 1 millisecond, respectively. The recurrence frequency is greatly dependent upon the biasing potential applied to the surge electrode and the values of resistor 41 and capacitor 42.

It will be readily evident that the invention is not limited to the above-mentioned applications and that many modifications therein are possible. Thus, an advantageous use may be made, for example, of the fact that the potential of the surge electrode follows the potential of the control electrode, for example for obtaining a voltage source having a low internal resistance.

What is claimed is:

1. A semi-conductor arrangement comprising a wafer of high-resistance semi-conductive material, two spaced electrodes of opposite-type conductivities on the same surface of the wafer and defining with the intervening body portions a diode current path, means establishing a potential difference between the said two spaced electrodes, a rectifying connection to the opposite surface of the wafer at a location opposed and close to that one electrode of the two whose conductivity-type is the opposite-equivalent of its own, and means establishing reverse biasing of the rectifying connection whereby a depletion region formed in said body and originating at said rectifying connection interrupts the said diode current path before punching-through to the other electrode of the two.

2. An arrangement as set forth in claim 1 wherein the absolute value of the difference between the active donor and acceptor impurities in the semi-conductive material is less than $10^{13}$ per cubic centimeter.

3. An arrangement as set forth in claim 2 wherein the semi-conductive material has a relatively large band-gap.

4. An arrangement as set forth in claim 1 wherein means are provided for forward-biasing said one electrode of the two causing the injection of charge carriers into the wafer and a substantial flow of current through the rectifying connection.

5. An arrangement as set forth in claim 4 wherein an impedance is connected to the rectifying connection.

6. An arrangement as set forth in claim 4 wherein the reverse biasing means is variable to control the bias of said one electrode at which injection occurs.

7. A semi-conductor arrangement comprising a wafer of high-resistance semi-conductive material, two closely-spaced opposed low-resistance zones of opposite-type conductivities in said wafer of which one is larger than the other and constitutes a rectifying connection, a third low-resistance zone in the wafer at the same side as the smaller of the other two zones and of opposite-type conductivity than that of said smaller zone and spaced further from the smaller zone than the latter is spaced from the larger zone, means establishing a potential difference between said smaller zone and the third zone forming a diode current path therebetween, and means including means establishing reverse biasing of the said larger zone for forming a depletion region in said wafer originating at said larger zone and interrupting the said diode current path before punching-through to the third zone.

8. An arrangement as set forth in claim 7, wherein the larger zone has a diameter at least 1.5 times greater than that of the smaller zone, whereby the depletion region may envelop the smaller zone.

9. An arrangement as set forth in claim 7, wherein the larger and smaller zones are at the center of the wafer, and the third zone has an annular shape at the edge of the wafer.

10. An arrangement as set forth in claim 7 wherein a resistor and capacitor are coupled to said smaller zone for periodically altering its bias.

11. A semi-conductor arrangement comprising a wafer of high resistance semi-conductive material, a first large low-resistance zone at one side of said wafer and constituting a rectifying connection, second and third smaller low-resistance zones at the opposite side of the wafer and opposed to the first zone, said second zone being of a conductivity-type opposite to that of the first zone and said third zone being of a conductivity-type opposite to that of the second zone, means establishing a potential difference between the second and third zones thus forming a diode current path therebetween, a fourth low-resistance zone in front of the third zone, and means establishing reverse biasing of the first zone whereby a depletion region formed in said wafer and originating at said first zone interrupts the said diode current path without punching-through to the third zone.

12. An arrangement as set forth in claim 11 wherein a groove is provided in the wafer surrounding the second zone and extending toward the first zone.

13. A semi-conductor arrangement comprising a wafer of high-resistance semi-conductive material having opposed sides, two closely-spaced opposed low-resistance zones of the same type conductivity in said wafer at opposite sides of said wafer and facing one another across the wafer of which one zone is larger than the other and constitutes a rectifying connection, a third low-resistance zone in the wafer at the same side of the wafer as the smaller of the other two zones and of opposite-type conductivity than said smaller zone and spaced further from the smaller zone than the latter is spaced from the larger zone and forming a diode current path with the smaller zone, means for biasing the larger zone in the back direction whereby a depletion region formed in said wafer and originating at said larger zone interrupts the said diode current path, and a groove surrounding the smaller zone and extending in the wafer toward the larger zone and closer to the larger zone than the smaller zone and preventing punch-through to the said smaller zone.

14. A semi-conductor arrangement comprising a high-resistance semi-conductive body, two spaced zones of opposite-type conductivities in said body and defining with the intervening body portions a diode current path, a rectifying connection to said body and spaced from the said two zones, means for biasing said rectifying connection in the reverse direction and forming a depletion region in said body originating at said rectifying connection and interrupting the said diode current path before punching-through to that one zone of the said two zones whose conductivity-type is equivalent to its own, said biasing value for the rectifying connection being substantially greater than that value required just to interrupt the diode current path, and means establishing a potential difference between the two spaced zones including means for applying to the other of the said two zones a potential at which said other zone is biased in the forward direction.

15. A semi-conductor arrangement comprising a high-resistance semi-conductive body, two spaced zones of opposite-type conductivities in said body and defining with the intervening body portions a diode current path, a rectifying connection to said body and spaced from the said two zones, means for biasing said rectifying connection in the reverse direction and for forming a depletion region in said body originating at said rectifying connection and interrupting the said diode current path before punching-through to that one zone of the said two zones whose conductivity-type is equivalent to its own, an impedance affording positive feedback coupled to the rectifying connection, and means establishing a potential difference between the two spaced zones including means for applying to the other of the said two zones a potential at which said other zone is biased in the forward direction.

16. An arrangement as set forth in claim 15 used as an electronic switch, wherein means are provided to vary the potential of the rectifying connection relative to that of the said other zone causing the latter to become forward biased and inject carriers into the body.

References Cited in the file of this patent

UNITED STATES PATENTS

| | | |
|---|---|---|
| 2,790,037 | Shockley | Apr. 23, 1957 |
| 2,877,359 | Ross | Mar. 10, 1959 |
| 2,883,313 | Pankove | Apr. 21, 1959 |
| 2,927,221 | Armstrong | Mar. 1, 1960 |
| 2,933,619 | Heywang | Apr. 19, 1960 |

UNITED STATES PATENT OFFICE

CERTIFICATE OF CORRECTION

Patent No. 3,081,404 March 12, 1963

Oscar Willem Memelink

It is hereby certified that error appears in the above numbered patent requiring correction and that the said Letters Patent should read as corrected below.

Column 8, line 34, strike out "voltage permissible therefor. In the "off" condition, on", and insert instead -- The term "diffusion length L" is to be understood to mean --; line 74, for "of", first occurrence, read -- to --; column 9, line 58, for "large" read -- larger --.

Signed and sealed this 8th day of October 1963.

SEAL)
.ttest:

EDWIN L. REYNOLDS

:RNEST W. SWIDER
.ttesting Officer

Acting Commissioner of Patents